Nov. 3, 1925.  
J. G. JONES  
1,560,167  
SEMIAUTOMATIC FILM SPOOLING LATHE  
Filed Nov. 18, 1921  
5 Sheets-Sheet 2

WITNESS  
Helen M. Fraser

INVENTOR  
John G. Jones,  
BY R. L. Stinchfield  
David H. Stewart  
ATTORNEYS.

Nov. 3, 1925.
J. G. JONES
1,560,167
SEMIAUTOMATIC FILM SPOOLING LATHE
Filed Nov. 18, 1921   5 Sheets-Sheet 3
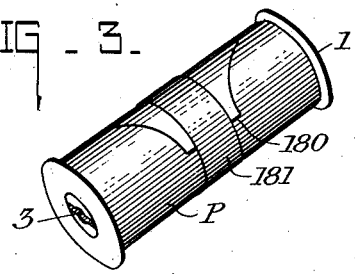
FIG_3_
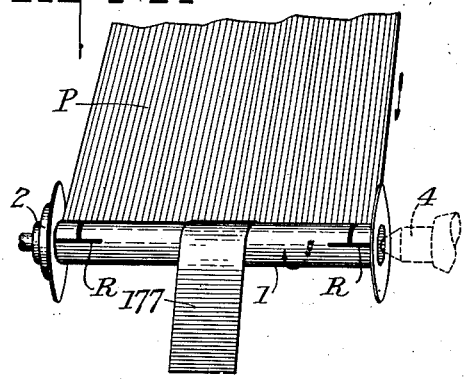
FIG_4_
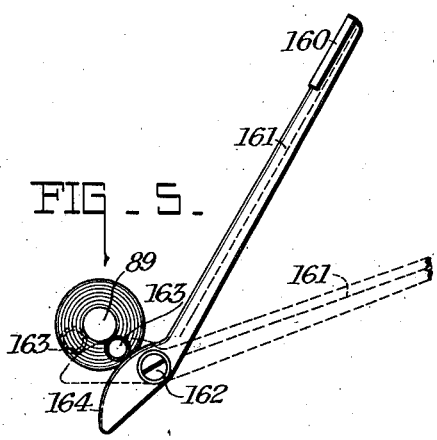
FIG_5_
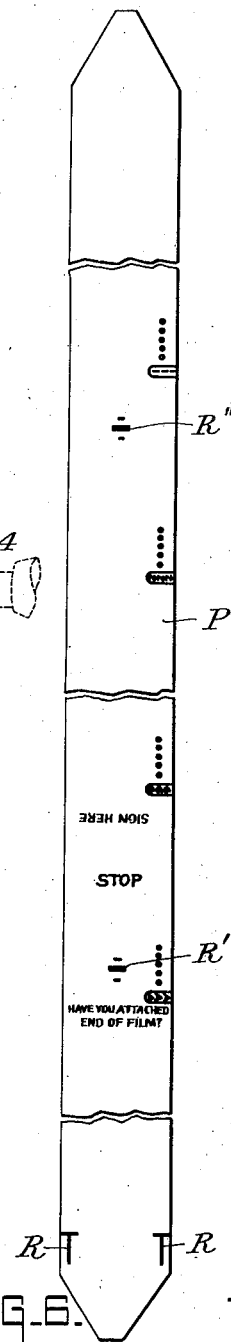
FIG_6_
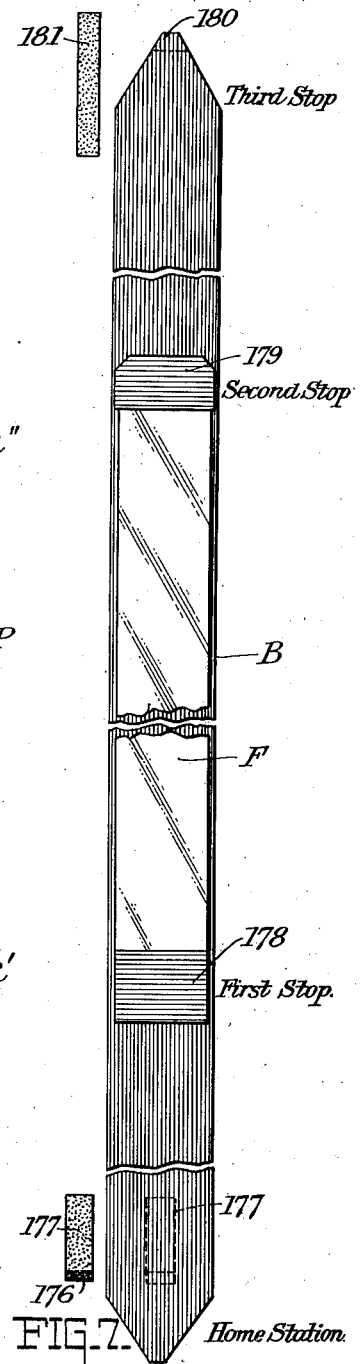
FIG_7_
WITNESS
Helen M. Fraser
INVENTOR
John G. Jones,
BY R. L. Stinchfield
Donald H. Stewart
ATTORNEYS Nov. 3, 1925. 1,560,167
J. G. JONES
SEMIAUTOMATIC FILM SPOOLING LATHE
Filed Nov. 18, 1921   5 Sheets-Sheet 4
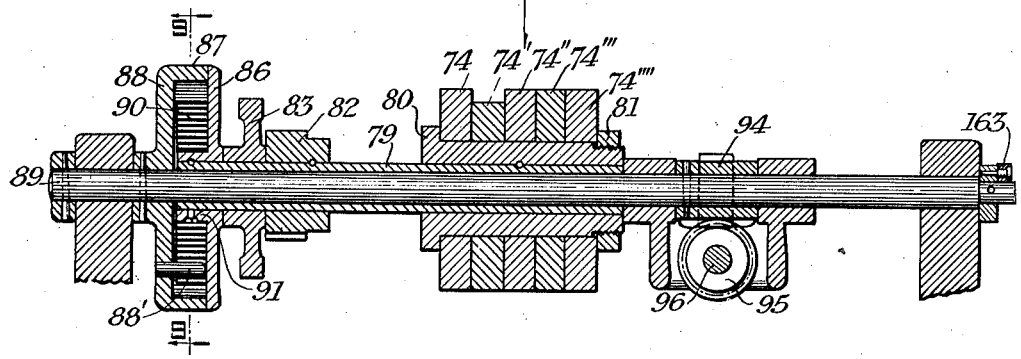
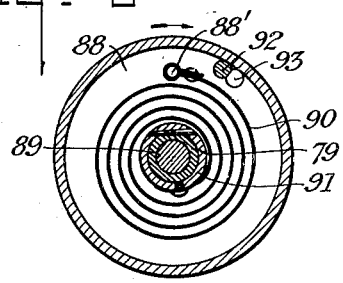
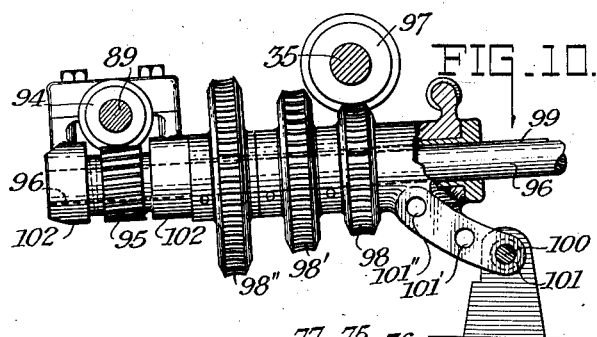
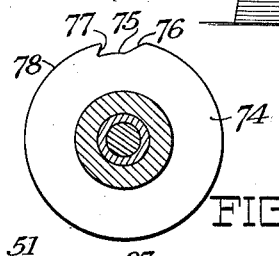
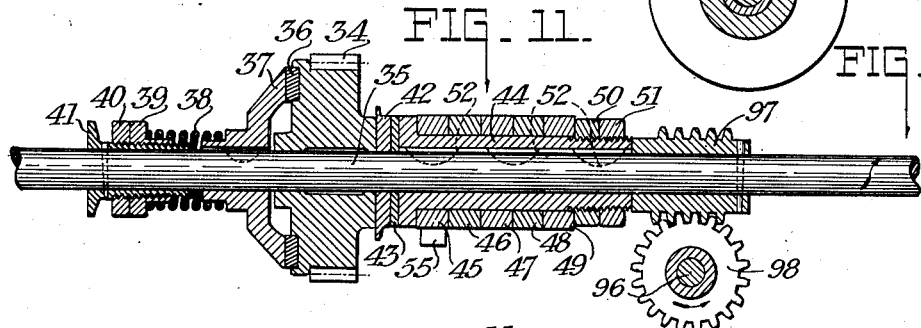
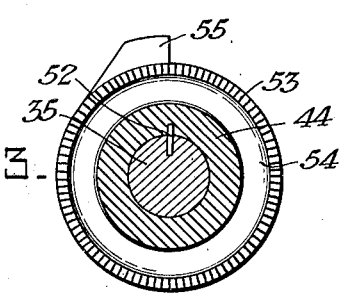
WITNESS
Helen M. Fraser
INVENTOR
John G. Jones,
BY R. L. Stinchfield
Donald H. Stewart
ATTORNEYS.

Nov. 3, 1925.
J. G. JONES
1,560,167
SEMIAUTOMATIC FILM SPOOLING LATHE
Filed Nov. 18, 1921  5 Sheets-Sheet 5
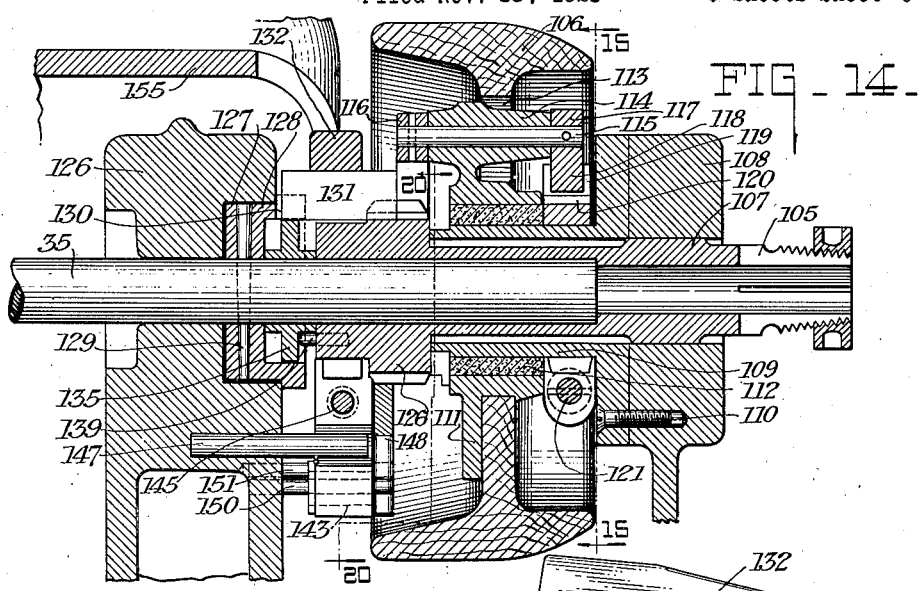
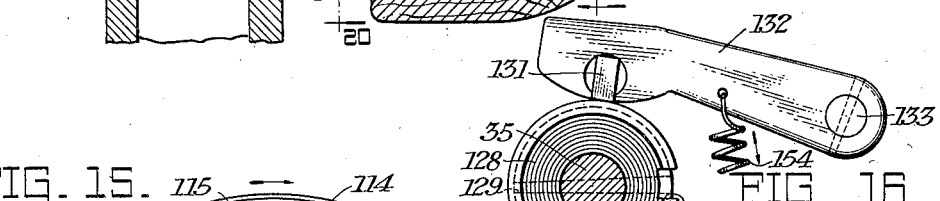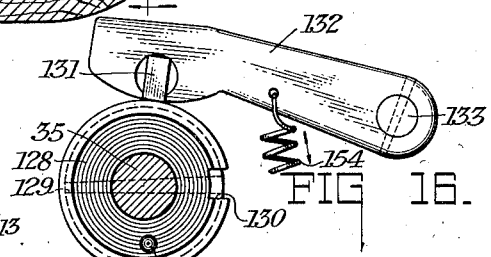
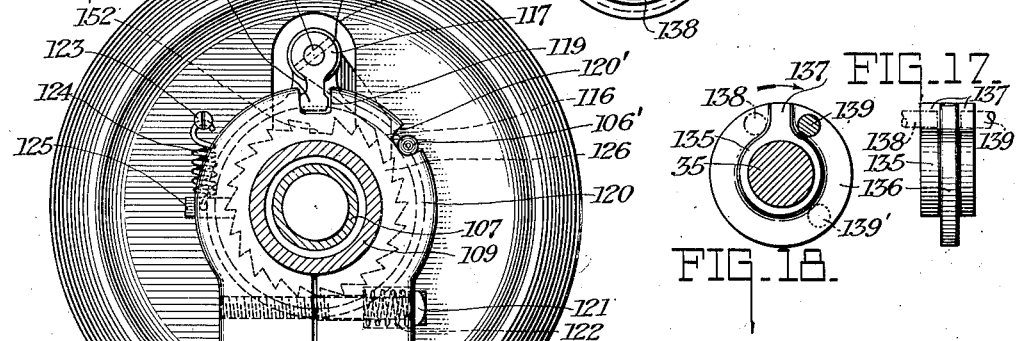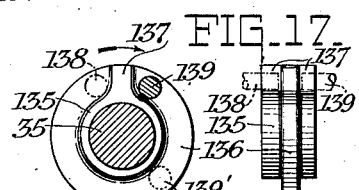
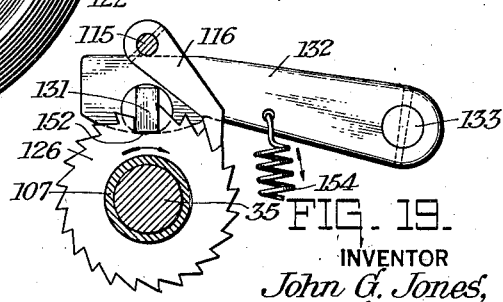
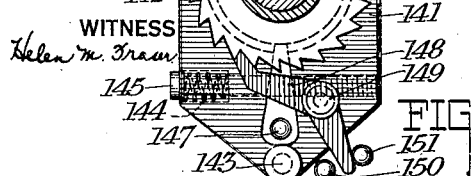
WITNESS
Helen M. Drain
INVENTOR
John G. Jones,
BY
ATTORNEYS.

Patented Nov. 3, 1925.

1,560,167

UNITED STATES PATENT OFFICE.

JOHN G. JONES, OF ROCHESTER, NEW YORK, ASSIGNOR TO EASTMAN KODAK COMPANY, OF ROCHESTER, NEW YORK, A CORPORATION OF NEW YORK.

SEMIAUTOMATIC FILM-SPOOLING LATHE.

Application filed November 18, 1921. Serial No. 516,229.

*To all whom it may concern:*

Be it known that I, JOHN G. JONES, a citizen of the United States of America, residing at Rochester, in the county of Monroe and State of New York, have invented certain new and useful Improvements in Semiautomatic Film-Spooling Lathes, of which the following is a full, clear, and exact specification.

This invention relates to spooling machines, and more particularly to film spooling machines adapted to wind upon a core, convolutions of paper and film such as are commonly used in photography. It has for its object to provide an efficient mechanism which can be readily operated in a dark room without the necessity of a skilled operator; to provide a machine which will automatically measure the proper amount of paper, film, etc.; to provide a means for adjusting the machine for different lengths and widths of film bands; to provide a means for automatically stopping the winding action at predetermined stations; to provide means for compensating for the varying diameter of the film rolls due to varying thickness of the film and paper convolutions; to provide a checking mechanism to prevent an operator from starting to wind a spool unless the machine is properly positioned for the start; to provide a guideway so that the strip material will be properly positioned for winding; to provide strip material tensioning means; to provide an assembly table which will cooperate with certain parts of the machine to facilitate the assembling of the film band; and to produce a combined mechanically and manually operable machine of the character above described. With these and other objects in view, the invention resides in certain combinations of parts, all as will be hereinafter more fully described, the novel features being pointed out in the claims at the end of the specification.

Photographic film spools comprise a central core with flanged ends upon which a strip of backing paper is wound, there being a film strip carried by the backing paper. The backing paper may be attached to each end of the film strip, or may extend throughout the length of the film strip extending beyond each end. The latter type is the best known. Still another well known type provides a semi-transparent backing paper, a sheet of carbon or transfer paper and a film strip all wound upon a spool, this type permitting legends to be written upon the backing paper and light printed upon the film in a well known manner. In any type of spooled film it is necessary to thread one end of the material used into a slot in the spool (or to otherwise attach it), to wind to a station where an operation is performed such as introducing an end of the film strip into the convolutions, to proceed winding to a station where another operation such as pasting an end of the film to the backing paper is performed; and to further proceed until the film spool is complete. It is necessary that these stations be accurately spaced, and in the past it depended entirely upon the accuracy of an operator observing certain locating marks on the film band (this term including the film, backing paper and carbon paper or such materials as are wound upon the spool). This required considerable skill and materially slowed down the spooling operation, because the spool could only be turned at a speed which would prevent the over-running of the locating marks.

My invention provides a machine adapted to be run at high speed, and provided with stops which will automatically stop the winding at the proper stations, and at the same time permitting of manual adjustments to compensate for different thickness of the film band, thereby accurately securing the spacings of the various parts of the film band.

Referring now to the drawings, in which like reference characters denote like parts throughout:

Fig. 3 is a completely filled film spool;

Figure 1:
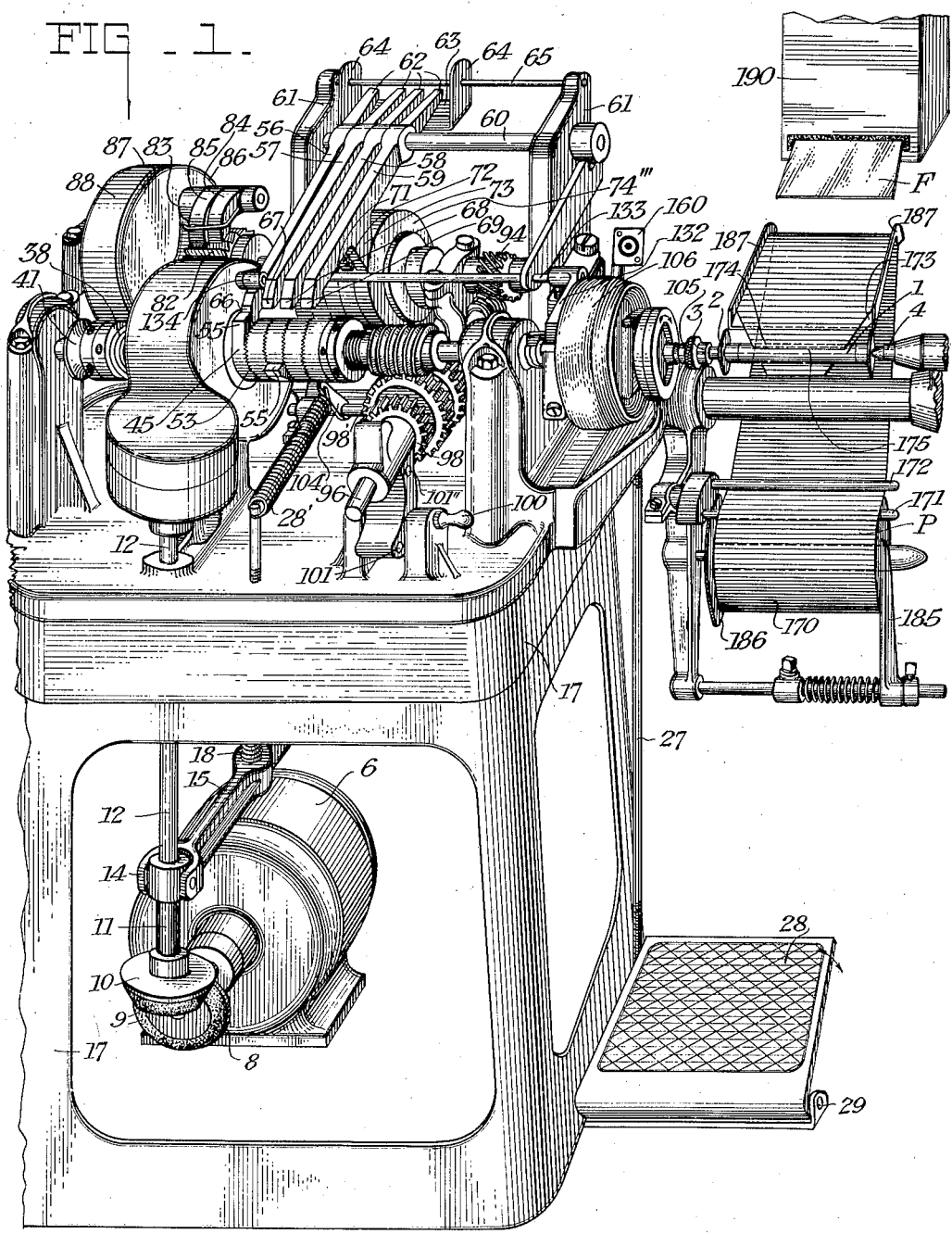
Fig. 1 is a perspective view of the essential parts of a machine constructed in accordance with and illustrating one form of my invention.

Fig. 4 llustrates one step in the winding operation;

Fig. 5 is an elevation of a signal;

Fig. 6 shows one side of a typical backing paper strip;

Fig. 7 is a film band, which in this case includes backing paper, film strip and pasters;

Fig. 8 is a section through the cam shaft;

Fig. 9 is a section on line 9—9 of Fig. 8;

Fig. 10 is a part side elevation and section of the secondary shaft;

Fig. 11 is a section through the stop shaft;

Fig. 12 illustrates a cam in elevation with its shaft in section;

Fig. 13 is an enlarged view, similar to Fig. 12 of one of the stops;

Fig. 14 is a section through the handwheel and associated parts;

Fig. 15 is a section on line 15—15 Fig. 14;

Fig. 16 shows the relation between the stop shaft disk and the home stop dog;

Fig. 17 is an end elevation of the lost motion disk;

Fig. 18 is a side elevation of the same part;

Fig. 19 indicates the relation between the handwheel ratchet, pawl and home stop dog; and Fig. 20 illustrates the ratchet, second pawl, and pawl operating device, being a section on line 20—20 of Fig. 14.

An operator places an empty spool 1, with its slotted end 2 in engagement with the spindle 3, and the opposite end rotatably held by the foot stock center 4, in a position known as the "Home station", after which the film band designated generally at B, (Fig. 7) is rapidly moved to the various stops here shown as "First, Second and Third". At each stop some operation is performed. To accomplish this winding, the following mechanism is used.

Starting with the motor 6 (Fig. 2) a stub shaft 7 drives the friction wheel 8, preferably faced with a frictional material 9. A similar wheel 10 is carried by the sleeve 11, which slides upon shaft 12 but turns with it, being connected by a spline 13. A yoke 14 engages sleeve 11, being pivoted thereto, the yoke being carried by a lever 15 pivoted at 16 to the frame 17. Lever 15 is normally held raised by spring 15' and also by a spring 28' hereinafter described. A push rod 18 carries nuts 19 which are adapted to compress more or less the spring 20 between nuts 19 and lever 15, nuts 21 being used for the adjustment. A yoke 22 embraces a pin 23 carried by lever 24 attached to shaft 25 which is actuated by the foot treadle 28 turning about pivot 29 so as to lower rod 27 connected thereto and to lever 26. A spring 28' assists spring 15' in normally holding the foot treadle 28 raised. Thus friction wheel 10 is lowered into engagement with wheel 8 and resiliently held there by spring 20 as long as the foot treadle is depressed. To limit the rotative movement of shaft 25, there is affixed to the shaft a part 30, with adjustable set screws 31, one or the other of these contacting with top 32 of frame 17 as either extreme of movement is reached.

Shaft 12, rotated as above described, transmits power through worm 33 to gear 34. As shown in Fig. 11 this gear is not affixed to shaft 35 but turns freely thereabout. Gear 34 has a frictional connection at 36 with clutch member 37 this part sliding upon but turning with shaft 35. A spring 38 presses 37 into contact with gear 34, the spring being adjustable by moving sleeve 39 and lock nut 40 upon sleeve 41. This shaft 35 is thus frictionally driven.

A spacer 42 and washer 43 separate sleeve 44 from gear 34. This sleeve is keyed to shaft 35 by a series of keys 52. A series of stops, 45, 46, 47, 48 and 49 are held tightly upon sleeve 44 by nuts 50 and 51, so that the stops can be adjusted as desired and locked firmly in place by friction, as shown in Fig. 11, if desired, or by the radial serrations 53 shown on stop 54, Fig. 13, these sawlike teeth forming a very positive and yet readily adjustable connection. (See also Fig. 1.) All the stops are of the shape shown in Fig. 13, where a side elevation of a typical stop 54 is shown with its projecting lug 55.

Figure 2:
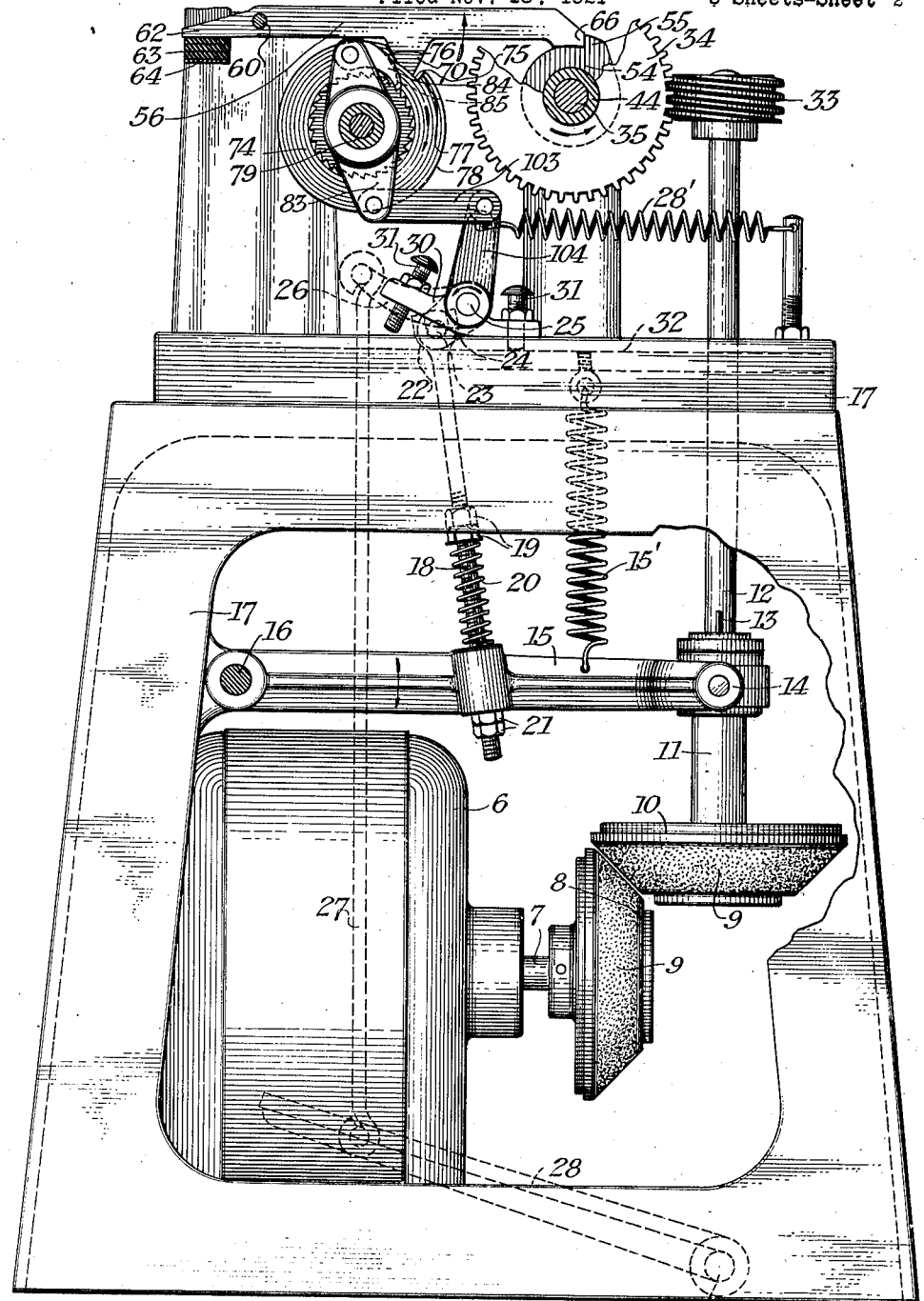
Fig. 2 is a part side elevation and part section of certain parts of the above described machine, illustrating the driving mechanism.

A dog is provided for each stop, and in this instance as only the first four stops are used, there are four dogs, 56, 57, 58 and 59. These parts are carried by a shaft 60, held by bearings in the frame 61. Each dog has a tail 62 which extends over a resilient pad 63 carried by a yoke 64 supported upon rod 65 which in turn is held by bearings in frame 61 as clearly shown in Fig. 1. The rubber pad 63 assists gravity in holding the stop contacting heads 66, 67, 68 and 69 of the dogs in lowered position, where they will contact with the lugs 55 of the various stops. In order to move the dogs away from the stops, each dog carries on its lower side a lug 70, 71, 72 or 73, as the case may be. Fig. 2 indicates this construction, lug 70 extending down from dog 56. This lug contacts with a cam 74, (or with a similar cam 74', 74" or 74'''). Cam 74, (Fig. 12) is notched at one point in its periphery 78, the notch having a curved bottom 75, concentric with the axis, a slanting side 76 and a sharp side 77.

As shown in Fig. 2, the head 66 of the dog is raised above the stop 55 as the inclined shoulder 76 cams lug 70 up to the periphery 78 of cam 74. Cam 74 together with the other cams are carried upon a sleeve shaft 79, best shown in Fig. 8. A sleeve 80 carries the cams 74, 74', 74", etc., tightly held in position by nut 81, these cams being adjustable as in the case of the stops. It might also be noted that in Fig. 1, only four cams are provided, as the machine is set up with four dogs, but in Figs. 8 and 11, I show five cams and stops for an additional operation.

Sleeve shaft 79 carries a ratchet wheel 82, keyed thereon, a rocker member 83 free on shaft 79 and provided with pawls 84 and 85, and rigid on the shaft 79, one side 86 of a lost motion connection 87, the other side 88 of which is keyed to the power shaft 89. The reason for having two pawls is that they care for a distance equal to one-half a tooth of the ratchet 126 as one is slightly longer than the other. A spring 90 connects the hub 91 of part 86 and a pin 88' extending into part 88 as shown in Figs. 8 and 9. Part 86 carries a pin 92 and part 88 a pin 93, the pins normally being in contact as shown. When turned in the direction shown by the arrow in Fig. 9, driving contact is secured through the contacting pins.

Shaft 89 is power driven through pinion 94, worm 95, and shaft 96, which, as shown in Fig. 10, derives power from shaft 35 through worm 97 and gear 98. A series of these gears, 98, 98' and 98'', are provided, all keyed to turn with shaft 96 by spline 99, but slidable therealong so that by placing pin 100, in any aperture, 101, 101' or 101'', a variety of speed adjustments can be obtained. The shaft can rock about shaft 89 by yoke 102. Shaft 89 then is driven when shaft 35 is clutched in with motor 6.

It is desirable to raise the holding dog before shaft 89 is power driven. For this purpose (Fig. 2), the rocker 83 is mounted to turn freely upon sleeve shaft 79, being moved a short distance by means of link 103, and lever 104 which is affixed to shaft 25. As previously described, shaft 25 is rocked by foot treadle 28 so that the first movement of this part moves the rocker and with it pawls 84 and 85, thus engaging ratchet 82 and turning sleeve shaft 79 about shaft 89 and moving cams 74, etc., a sufficient distance to release stop 55 by raising dog 56 (or 57, 58 or 59). This movement is accomplished before spring 20 is compressed a sufficient distance to cause wheels 8 and 10 to come into driving engagement. As pin 93 is moved from 92 (Fig. 9) by the pawl and ratchet movement above described, spring 90 is tensioned tending to bring the pins together. As wheels 8 and 10 clutch and shaft 89 turns, the spring 90 assists part 88 to catch up with part 86, and when the pins again engage each other the shafts drive as one unit.

So far, the means for rotating the cams, stops and the means for moving the dogs have been described. These contribute the power movement to the spindle 3 which is carried by the chuck 105. If all paper, carbon paper and film were of uniform thickness no additional movements would be necessary. As such is not the case manual adjustment is further provided by handwheel 106. Registration marks R, R', R'', etc., of various types are printed on the backing paper (Fig. 6). The machine mechanically winds and stops winding at the necessary stations. Fig. 7 for example, shows a series of such stations. By causing the automatic stop to function when material of the minimum thickness is used, the operator can readily advance the spindle by hand up to the registration mark. In practice this distance is frequently a very small portion of one turn of the handwheel.

The means for securing this manual movement will now be described, reference being had to Figs. 14 to 20. Chuck 105 is integral with a sleeve shaft 107 which is supported by bearing 108 of the frame, and which further surrounds the end of shaft 35, turning freely about it. The frame also supports a sleeve 109, affixed thereto, by screws 110 (one showing in Fig. 14). The handwheel 106 is carried by an annular casting 111, which is mounted upon an annular friction collar 112 surrounding sleeve 109. One side of handwheel 106 is perforated at 113 to permit a bearing 114 formed from casting 111 to extend therethrough, a shaft 115 turning in this bearing and carrying a pawl 116 on one end and a pawl rocker 117 on the other end. The pawl rocker 117 has an end 118 extending into a notch 119 in a friction collar 120, which is split at the bottom, being held together by a bolt 121, with a spring 122 beneath the head, thus keeping an even tension upon sleeve shaft 109. A screw 123 in wheel 106 holds one end of a spring 124, the other being attached to a rod 125 affixed to collar 120. A pin 106' carried by the handwheel 106 passes into a slot 120' in the friction collar 120 so as to limit the relative movement between these parts to the movement necessary to rock shaft 115 and with it pawl 116. The resulting action is that as handwheel 106 is moved in direction of arrow it frictionally turns on sleeve shaft 109, causing the pawl rocker 117 to engage slot 118 and thereby through shaft 115 cause pawl 116 to engage ratchet 126 as shown in Fig. 15. When pressure is released spring 124 moves the collar relative to the handwheel in a reverse direction, thus normally holding pawl 116 out of engagement with the ratchet. It can readily be seen that the spindle can be rotated without moving handwheel 106, but when manual operation is desired a slight movement of the handwheel throws in the pawl and ratchet by which sleeve shaft 107 and chuck 105 can be moved.

To permit this movement a lost motion connection between shaft 35 and spindle 107 is necessary. This is secured in the following manner: Bearing 126 supports shaft 35 and has a recess 127 in which an annular member 128 rests, (Fig. 14) but in which it may turn freely, being keyed at 129 to shaft 35. One side of this member is notched at 130 (Fig. 16) to provide a space into which the home station locking bar 131 may drop. A lever 132 carries this bar, and is pinned to shaft 133 (Fig. 1) which carries on its other extremity an arm 134 which rests over the end of dog 56. When the dog holds stop 45 in the initial position, (i. e., in position to start spooling) the locking bar may rest in notch 130, but when the dog is raised, the locking bar cannot engage the slot. In annular member 128 there rests a tumbler 135 (Figs. 17 and 18) which turns freely about shaft 35 and consists of a rib 136 extending around a central hub, and a flange 137 forming an abutment. A pin 138 extends from part 128 and is, therefore, fixed relative to shaft 35. A second pin 139 extends from ratchet wheel 126 (forming a part of sleeve 107) and is, therefore, fixed relative to the spindle. Motion is transmitted from shaft 35 by pin 138 engaging abutment 137 thus turning tumbler 135 and with it pin 139 and thus the chuck 105. But when shaft 35 is still, handwheel 106 can move the chuck, moving pin 139 from full lines to, for instance, the dotted ones at 139', Fig. 18. By further movement nearly two revolutions of the chuck can be obtained without moving shaft 35. When 35 starts, the tumbler 135 idly revolves until flange 137 picks up pin 139, after which the chuck moves with shaft 35.

In order to prevent the handwheel from turning the winding spindle backwards, the following mechanism is used: The ratchet 126 (Fig. 20) has a hub 140 supporting a yoke made of parts 141 and 142 hinged at 143, friction being secured through bolt 145 pressing on spring 144. The jaws of the yoke are faced with frictional material 146. When the ratchet moves, therefore, it tends to rotate this yoke, such movement being prevented beyond a limited amount by a pin 147 passing between parts 141 and 142 from the frame of the machine. This space permits slight movement in either direction. A pawl 148 pivoted at 149 to part 141 is turned about its pivot to or from engagement with the ratchet by the action of pin 150 or 151, which are fixed in the frame. When shaft 35 is turning chuck 105, the yoke tends to move in a clockwise direction (Fig. 20) and pawl 148 is moved from the ratchet by pin 150. Here, as shaft 35 can move in only one direction, there is no danger of the chuck turning backward. When, however, the chuck is advanced by handwheel 106 and ratchet 126 is advanced by pawl 116, tumbler 135 is moved so that it would be possible to turn the chuck backward a distance equal to that distance to which it is advanced by the handwheel. This is prevented, however, by pawl 148, because slight rearward movement rocks the yoke, causing pin 151 to throw pawl 148 into engagement with the ratchet.

It is necessary that the chuck and shaft 35 should bear the proper position relative to each other at the home station position. Ratchet 126 is, therefore, notched at 152 to engage locking bar 131 carried by lever 132 above described. As also above described, this bar can be dropped into locking position (actuated by spring 154) only when the first stop is properly located.

This machine is generally operated in a dark, or partially dark room. The working parts are all covered, that is from handwheel 106 to the left, by a cover plate 155, indicated in part in Fig. 14. To signal to the operator when the home station position is reached, or in other words when ready to start spooling, I provide a flag 160 (Fig. 5) which is carried by an arm 161 pivoted at 162 to the frame and having a cam surface 164 on the end. This cam is periodically engaged by pin 163 which is mounted off center upon cam shaft 89. This flag will call the operator's attention to the position of the machine parts. It may be coated with luminous material if desired.

In order to thread the strip material into the film spool quickly and direct the strip material smoothly and accurately toward the spool, I provide a guideway 173 across which the material is drawn, there being suitable flanges 187 to guide the material. These flanges are spaced similarly to the film spool flanges and are in alignment with the flanges. As the guideway is accurately placed at right angles to the winding axis of the spool, there is no tendency to bind on either side of the film spool. The backing paper is drawn from the roll at 170 through fingers 171 and 172 which smooth the paper and tension it, holding it firmly upon the guideway 173. An arm 185 holds an edge of the roll against a flange 186. When the film F is drawn from its receptacle 190, the end is drawn down through flanges 187 and a paster 177 is fastened by a small area 176 to the backing paper, the bottom of the guideway 173 serving as a table upon which the necessary pressure to attach the paster can be exerted. As the film is caught and wound in convolutions upon the spool and the second stop is reached, guideway 173 is again used as a table for the positioning of paster 179.

The operation of spooling will be next described, taking as an illustration a simple film band comprising merely backing paper, film and sticker bands, such as is shown in Fig. 7. An empty spool 1 is placed in position so that the slotted end 2 is in engagement with the spindle 3 and the opposite end is supported by the center stock 4, the machine being at its initial setting, as indicated by the raised flag 160.

Backing paper P from the roll 170 is passed between the tensioning fingers 171 and 172 (Fig. 1) and over a guide plate 173, the tapered end 174 being threaded into the spool slot 175. Handwheel 106 is turned to catch the end using marks R to indicate the proper position for the first paster. A small portion 176 of the gummed paster 177 is moistened and stuck in place (see Figs. 4 and 7).

The foot treadle 28 is depressed causing the rapid winding of the film backing paper to the first stop, indicated at R' in Fig. 6. If registration mark R' does not appear in its proper location the spool is turned by handwheel 106 until the mark appears. In practice this is generally a very small portion of a turn and is quickly done. Here the film band F to which is pasted a paster 178 is entered and caught in a convolution of the paper by a short turn of the handwheel. The treadle is released after each stop.

Again depressing the treadle the film band is rapidly wound to the second stop, where the film F is fastened to the back paper P by paster 179, guideway 173 forming a convenient table for this operation. Registration mark R" is, of course, first properly positioned by hand.

The third stop is reached in a similar manner, and here the tip 180 is folded (dashed lines Fig. 7) and the final paster 181 is placed about the completed cartridge, as in Fig. 3.

The home station position is reached by again depressing the treadle causing the parts to move until dog 56 engages stop 45 permitting shaft 133 to rock when lever 134 descends, thereby allowing the locking bar to ride upon the periphery of 128 until it drops into notch 130. It will drop into notch 152 of the ratchet at the same time as the lost motion in the connection is entirely taken up.

I have frequently referred to parts of my machine as being manually operated. This term, it is to be understood, is not to be limited alone to operation by hand, but is to cover also any voluntary control by an operator. It is intended to distinguish between the power drive which is purely mechanical, and the personal operation by a workman.

Having thus described my invention what I claim as new and desire to secure by Letters Patent is:

1. In a machine of the class described, means for engaging and rotating a spool, means automatically operative to cause a cycle of stops to such rotation, controllable means for causing renewal of rotation after each stop, the second named means being adjustable to predetermine separately the number of rotations after each stop of the cycle.

2. In a film spooling machine, the combination, with a spindle adapted to revolve a spool to assemble and to wind a film band thereon, of means for rotating the spindle, means for automatically stopping the spindle to permit a step of the assembling of the film band, and means for adjusting the spindle manually without affecting the means for automatically stopping the winding.

3. In a film spooling machine, the combination with a spool rotating spindle, of means for rotating the spindle, automatic means adapted to be set to stop the spindle after a predetermined number of revolutions, and manual means for rotating the spindle when the first mentioned film rotating means is at rest, without affecting the setting of the automatic means.

4. In a film spooling machine, means for rotating a spool to wind a film strip thereon, a series of stops to automatically halt the rotation at predetermined intervals, manual means for rotating the spool when the first named means is not operating, and means for automatically compensating for the distance the spool is manually rotated so that the total distance between two consecutive intervals will remain unaltered.

5. In a film spooling machine, the combination with a spindle for rotating a spool to wind a film band thereon, of power driven means for rotating the spindle, and manually operated means for rotating the spindle, stops to control the rotation of the spindle periodically between assembly stations, and means for keeping the distance between two consecutive stations constant irrespective of the mode of rotation.

6. In a film spooling machine, the combination with a spindle for turning a spool upon which a film band is to be wound, of separate manual and power operated means for rotating the spindle, the manual means having an operative and an inoperative position with respect to the spindle, being disconnected therefrom when in the inoperative position, and the extent of manual rotation being less than the extent of power rotation, so that the manual means can be used to correct errors of positioning resulting from the use of the power means.

7. In a film spooling machine, the combination with a spindle for rotating a film spool to wind a film band thereon, of a spindle driving shaft, means for starting and stopping the driving shaft, a tumbler carried by the shaft, cooperating parts of the tumbler, spindle and drive shaft serving to rotate the spindle when the drive shaft is rotating, and permitting the spindle to be rotated manually when the drive shaft is idle.

8. In a film spooling machine, the combination with a spindle for rotating a film spool to wind a film band thereon, of a spindle driving shaft, means for starting and stopping the driving shaft, a tumbler carried upon the driving shaft and adapted to cooperate with the driving shaft and the spindle to turn the latter when the former is rotating and permitting further movement of the spindle independent of the driving shaft.

9. In a film spooling machine adapted to rotate a spool, the combination with a spindle for rotating the spool, of a driving shaft therefor, a lost motion connection between the spindle and the spindle driving shaft comprising an annular member splined to the driving shaft, a tumbler mounted to turn freely on the shaft, the spindle and driving shaft turning about a common axis, pins carried, one by the annular member and one by the spindle, for engaging the tumbler when the spindle is turned by the drive shaft, one pin leaving its driving position relative to the tumbler when the spindle is rotated without moving the shaft.

10. In a spooling machine adapted to rotate a film spool, the combination with a spindle for rotating the spool, of a driving shaft therefor, a lost motion connection between a spindle and a spindle driving shaft comprising a member affixed to the shaft, a tumbler mounted to turn freely upon the shaft, and a spindle adapted to turn on a common axis with the shaft, a portion of the spindle forming a driving connection through the tumbler and the member affixed to the shaft to permit of the spindle being driven by the shaft, said portion of the spindle being rotatable independently of the member affixed to the shaft to permit movement, limited by the tumbler, of the spindle independent of the shaft.

11. In a film spooling machine, the combination with a spindle for rotating a spool, of a motor driven means for revolving the spindle a predetermined number of revolutions, means for manually turning the spindle when the motor driven means is not rotating the spindle, and a latch, operable when the spindle is moved through either of the turning means adapted to position the spindle relative to the motor driven means for revolving the spindle a predetermined number of revolutions to insure the proper relative position between the spindle and the means for revolving the spindle through a predetermined number of revolutions at the start of the winding operation.

12. In a film spooling machine, a spindle for rotating a spool, motor driven means for rotating the spindle, means for manually turning the spindle when the motor driven means is not operating, and means adapted to position the spindle relative to the motor driven means, said motor driven means being inoperative to start rotation of said spindle unless said parts are properly positioned by said positioning means.

13. In a film spooling machine, a spindle for rotating a spool, a shaft for rotating the spindle, mechanisms controlling the movement of the shaft, a lost motion connection between the spindle and the shaft, means for locking the spindle and shaft in operative relation only when the mechanisms are in a certain definite relation.

14. In a film spooling machine, the combination with a spindle for rotating a spool, of a shaft for rotating the spindle, cams, dogs and stops cooperating to control the movement of the shaft and having an initial or starting position, a lost motion connection between the spindle and the spindle drive shaft, and means for locking the spindle and shaft in an initial or starting position comprising a home station locking bar adapted to engage the drive shaft and the spindle only when the cams, dogs and stops are in their initial or starting position.

15. In a film spooling machine, the combination with a spindle for rotating a spool, of a shaft for rotating the spindle, a lost motion connection between the shaft and the spindle, stops and dogs cooperating to control the movement of the spindle and having an initial or starting position, a home station locking bar adapted to engage parts of both the spindle and the spindle operating shaft when they are in their starting position, said home station locking bar being governed by a dog so as to engage the spindle and shaft only when a stop is held by the dog in the initial or starting position.

16. In a film spooling machine, the combination with a spindle for rotating a spool, of a shaft for rotating the spindle, a lost motion connection between the shaft and the spindle, mechanisms comprising a stop and a dog for controlling the movement of the shaft and a locking device adapted to hold the shaft and the spindle in a predetermined relative position until unlocked by the dog.

17. In a film spooling machine, the combination with a spindle adapted to rotate a spool, of a shaft for rotating the spindle, a lost motion connection between the shaft and the spindle, a motor for rotating the shaft, mechanism for controlling the movement of the shaft by the motor, a latch adapted to hold the spindle and the spindle shaft in a predetermined position relative to each other, and means for manually operating the mechanism and for simultaneously moving the latch so that the shaft may drive the spindle.

18. In a film spooling machine, the combination with a notched spindle for rotating the spool, of a notched power shaft for moving the spindle, manual means for moving the spindle, a lost motion connection between the shaft and spindle, automatic mechanism for stopping the drive shaft at predetermined intervals during one cycle of winding, said notches being capable of being brought into alignment, and means for locking the spindle and shaft and comprising a member adapted to engage the notches when in alignment preparatory to a cycle of operations, said member being controlled by the automatic stop mechanism.

19. In a film spooling machine, the combination with a spindle adapted to rotate a spool, of a shaft for rotating the spindle, means for rotating the spindle independently of the shaft, a tumbler between the shaft and spindle having a driving position and an idle position with respect to the shaft and the spindle, and a latch adapted to hold the said elements in driving position.

20. In a film spooling machine, the combination with a spindle for revolving a spool, of a shaft for driving the spindle by power, and a wheel for moving the spindle manually, the handwheel remaining normally out of engagement with the spindle, but being operatively connected thereto by movement of the handwheel, the first movement engaging the spindle, and further movement turning the spindle.

21. In a film spooling machine, the combination with a spindle for revolving a spool, of a shaft for driving the spindle, a frame supporting the spindle and shaft, and a wheel mounted revolubly upon the frame for manually turning the spindle, a clutch mechanism between the handwheel and spindle permitting the handwheel to move the spindle when turned in one direction, and releasing the connection with the spindle when turned in the opposite direction, and means located on the frame tending to hold the handwheel against movement.

22. In a film spooling machine, the combination with a spindle for revolving a spool, of a shaft for driving the spindle, a frame supporting the spindle and shaft, and a wheel mounted revolubly upon the frame for manually turning the spindle, a clutch mechanism between the handwheel and spindle by which the spindle can be moved in one direction only, the handwheel being normally held stationary by the frame.

23. In a film spooling machine, the combination with a spindle for rotating a film spool, of a shaft for driving the spindle by power, and a wheel for manually turning the spindle, a ratchet carried by the spindle, a pawl mounted on the handwheel to move to and from the ratchet, a friction collar adapted to rock the pawl into engagement when the handwheel is moved in one direction, and a spring for rocking the pawl from the ratchet when the handwheel is at rest.

24. In a film spooling machine, the combination with a machine for rotating a film spool, of a spindle for rotating the spool, a frame, a power shaft carried by the frame and adapted to drive the spindle, a wheel supported upon the frame adapted to be operated manually to revolve the spindle, the wheel being normally free from driving engagement with the spindle and remaining at rest when the spindle is operated through the power shaft, a clutch for operatively connecting the handwheel and spindle when the handwheel is moved in one direction, said clutch automatically releasing the spindle when the movement of the handwheel in one direction is stopped.

25. In a film spooling machine, the combination with a machine for rotating a film spool, of a spindle for rotating the spool, a frame, a power shaft carried by the frame and adapted to drive the spindle, a wheel supported upon the frame adapted to be operated manually to revolve the spindle, a frictional connection between the wheel and the frame, a frictional collar carried by the frame, and a clutch mechanism adapted to engage the spindle when actuated by the collar, the rotative movement between the wheel and collar causing the clutch mechanism to function.

26. In a film spooling machine, the combination with a machine for rotating a film spool, of a spindle for rotating the spool, a frame, a power shaft carried by the frame and adapted to drive the spindle, a wheel supported upon the frame adapted to be operated manually to revolve the spindle, a frictional connection between the wheel and the frame, a frictional collar carried by the frame, a clutch mechanism between the handwheel and the spindle, being actuated by the movement of the collar relative to the handwheel as the latter is rotated, and being released by a spring which moves the collar relative to the handwheel as the latter comes to rest.

27. In a film spooling machine, the combination with a spool rotating spindle for winding strip material upon a spool, of a frame, a shaft for revolving the spindle carried by the frame, a wheel for moving the spindle manually also mounted on the frame, a lost motion connection between the shaft and the spindle permitting the spindle to be moved by the wheel without moving the shaft, and means connected to the frame for preventing the movement of the spindle in one direction.

28. In a film spooling machine, the combination with a spool rotating spindle for winding strip material upon a spool, of a frame, a shaft for revolving the spindle carried by the frame, a wheel for moving the spindle manually, a lost motion connection between the shaft and the spindle, and means connected to the frame for preventing the movement of the spindle in one direction, comprising a yoke adapted to be rocked by movement of the spindle, a member actuated by the rocking of the yoke to engage or release the spindle.

29. In a film spooling machine, the combination with a spool rotating spindle for winding a film band on a spool, of a frame, a spindle for rotating the spool carried by the frame, a wheel for rotating the spindle manually, a ratchet carried by the spindle, a pawl adapted to engage the ratchet, a yoke frictionally engaging the spindle, means for limiting the movement of the yoke relative to the frame, and means including the pawl and yoke for releasing the ratchet when the spindle is turned in one direction and engaging the ratchet and preventing the spindle from turning in the other direction.

30. In a film spooling machine, means for revolving a spool, a power drive for the spool revolving means, a manual control for the power drive, a slip connection between the power drive and the spool revolving means, and a device for positively stopping the spool revolving means after a predetermined number of revolutions, slip being permitted in the slip connection between the power drive and the spool revolving mechanism when the device for stopping the spool revolving means functions, and until the power drive is stopped by the manual control.

31. In a film spooling machine, the combination with a driven shaft for revolving a spool, a dog, means for actuating the dog, a stop normally rotated by the shaft, a slip connection between the shaft and the stop whereby movement of the shaft will be prevented by a dog engaging a stop while the drive shaft continues to rotate.

32. In a film spooling machine, a shaft for revolving a spool, a drive shaft, a slip connection between said shafts, a series of stops carried by said first named shaft, a series of dogs adapted to selectively engage said stops and a series of cams adapted to actuate the dogs, one of said cams being adapted to cause a dog to engage a stop, thereby causing slip at the slip connection.

33. In a film spooling machine, the combination with a shaft for revolving a spool, of a motor for rotating the shaft, a clutch and a slip connection between the motor and the shaft, a stop on the shaft, a dog adapted to engage the stop, means for actuating the clutch, the dog being adapted to stop the shaft by engaging the stop, thereby causing the spindle shaft to stop because of a slip at the slip connection until the clutch is released by the clutch releasing means.

34. In a film spooling machine, the combination with a shaft for turning a film spool, of a drive shaft, a motor, a clutch between the motor and the drive shaft, a slip connection between the drive shaft and the first named shaft, a series of stops carried by the first named shaft, a series of dogs adapted to selectively engage the stops, a series of cams adapted to actuate the dogs and means for operating the above mentioned parts, one of said cams being adapted to cause a dog to strike a stop, thereby causing a slip at the slip connection and halting the spindle operating shaft before the clutch is released by the operating means.

35. In a film spooling machine, means for rotating a spool, a cam actuating shaft, cams carried thereby, mechanisms controlled by said cams and controlling said first named means, and a lost motion connection between said cams and the shaft, permitting the cams to be moved relatively to the shaft.

36. In a film spooling machine, means for rotating cams, a cam actuating shaft, power means for actuating said shaft, mechanisms controlled by said cams and controlling said first named means, means for manually moving said cams, and a lost motion connection between said cams and the cam operating shaft, permitting the cams to be moved manually relatively to the shaft in advance of the application of power to the shaft.

37. In a film spooling machine, a shaft for rotating a spool, a cam actuating shaft, cams carried thereby, dogs moved by the cams, stops acted upon by the dogs for controlling the rotation of the first named shaft, motor means for moving the shafts, and a lost motion connection between the cams and the cam operating shaft permitting the cams to be moved in advance of the cam shaft.

38. In a film spooling machine, a shaft for rotating a spool, a cam actuating shaft, cams carried thereby, dogs moved by the cams, stops acted upon by the dogs for controlling the rotation of the first named shaft, motor means for moving the shafts, and a lost motion connection between the cams and the cam operating shaft, means for operating the cams by which the cams may be moved relative to the cam operating shaft before the cams are moved by the motor.

39. In a film spooling machine, a shaft for rotating a spool, a cam actuating shaft, cams carried thereby, dogs moved by the cams, stops acted upon by the dogs for controlling the rotation of the first named shaft, motor means for moving the shafts, a lost motion connection between the cams and cam operating shaft comprising cooperating pins carried respectively by the cams and by the cam shaft, and a spring tending normally to hold the pins together in driving relation.

40. In a film spooling mechanism, the combination with a spindle for rotating a spool, of a motor for operating the spindle, and means including a cam for controlling the operation of the spindle, a motor operated cam driving shaft, and means independent of the driving shaft for operating the cam, connections between the cam and cam driving shaft for maintaining a definite relation between the cam and cam shaft when the latter is operated by the motor.

41. In a film spooling mechanism, the combination with a spindle for rotating a spool, of a motor for operating the spindle, and means including a cam for controlling the operation of the spindle, a motor operated cam driving shaft, the cam being carried upon the shaft, a ratchet on the cam, a pawl to engage the ratchet, and means for moving the pawl and ratchet without moving the shaft.

42. In a film spooling mechanism, the combination with a spindle for rotating a spool, of a motor for operating the spindle, and means including a cam for controlling the operation of the spindle, a motor operated cam driving shaft, the cam being carried upon the shaft, a ratchet affixed to the cam, a pawl for moving the ratchet, a rocker arm for moving the pawl, and connections between the cam driving shaft and the cam for moving the latter without moving the cam rocker arm.

43. In a film spooling machine, the combination with a spindle for rotating a spool, of stops, dogs and cams for controlling the movement of the spindle, the dogs being adapted to engage the stops, means for starting the movement of the cams to release the dogs from the stops, and motor means continuing the cam movement until halted by a dog.

44. In a film spooling machine, the combination with a spindle for rotating a spool, of a motor for operating the spindle, stops for automatically stopping the spindle, dogs for engaging the stops, cams for operating the dogs, means for synchronizing the relative movement of the stops, cams, and dogs, including a driving shaft for the cams and a driving shaft for the stops, and a tripping mechanism, connections between the tripping mechanism and the cams whereby the latter are moved during the first part of the movement of the tripping mechanism without disturbing the relation of the cam and the stop driving shafts.

45. In a film spooling machine, the combination with a spindle for rotating a spool, of a motor for operating the spindle, means including a cam for periodically stopping the spindle, a cam driving shaft, means for normally holding the cam in a definite relation thereto, and a tripping mechanism, there being means for moving the cam without moving the cam driving shaft, said means temporarily changing the relative relation between the cam and the cam driving shaft.

46. In a film spooling machine, means for rotating a spool, a motor, a clutch between the motor and said means, cams, mechanism controlled by said cams for stopping and starting said rotating means, a tripping means adapted first to actuate said cams and then to actuate the clutch.

47. In a film spooling machine, means for rotating a spool, a motor, a cam shaft, cams carried thereby, a clutch between the motor and said means and shaft, mechanism controlled by said cams for controlling said rotating means, the cam shaft having a driving relation with the cams but the cams being adapted to be moved relatively to the shaft and tripping mechanism adapted first to move the cams relatively to the cam shaft and then to actuate said clutch.

48. In a film spooling machine, the combination with a shaft for winding a film band, of a motor for driving the shaft, a clutch between the motor and shaft, stops on the shaft, dogs to engage the stops, cams to actuate the dogs, a shaft for moving the cams, a rocker arm for moving the cams independent of the cam shaft, and a tripping mechanism, said tripping mechanism being adapted first to move the cams independent of the cam shaft so as to actuate a dog so that the spindle shaft can be rotated, further movement of the tripping mechanism throwing in the clutch and rotating the spindle.

49. In a film spooling machine, the combination with a spindle for rotating a spool to wind a film band thereon, of a shaft for operating the spindle, of means for controlling the shaft including a cam, a motor, a clutch between the motor and spindle, a tripping mechanism, a spring, means for actuating a cam by the first part of the tripping movement, said movement also compressing said spring to cause the same to operate the clutch to rotate the spindle as the tripping movement is completed.

50. In a film spooling machine, means for rotating a spool, a motor, a clutch between the motor and said means, mechanism for controlling said means adapted to be tripped and then to be driven by said means, and a tripping mechanism adapted first to trip said controlling mechanism and then to actuate said clutch.

51. In a film spooling machine, means for rotating a spool, a motor, a clutch between the motor and said means, a cam shaft driven by said means, cams carried on the shaft, mechanism controlled by said cams for controlling the rotating means, a tripping means adapted first to move the cams and then to actuate the clutch.

52. In a film spooling machine, means for rotating a spool, a motor, a clutch between said motor and said means, an adjustable control mechanism adapted to be manually tripped, an adjustable driving connection for driving said mechanism from said means, a tripping mechanism adapted first to trip said control mechanism and then to actuate said clutch, the control mechanism being adapted to stop the operation of said means after an interval, determined by the adjustments.

53. In a film spooling machine, the combination with a shaft for rotating a spool, stops on the shaft, dogs for contacting with the stops, cams for actuating the dogs, and a shaft for supplying power to the cams, means for altering the relative speed of the cams with respect to the stops.

54. In a film spooling machine, the combination with a shaft for rotating a spool, stops on the shaft, dogs for contacting with the stops, cams for actuating the dogs, and a shaft for supplying power to the cams, a gear on the shaft, a gear on the cam shaft, and means for altering the relative position of the cams and stops comprising a swinging stub shaft carrying a series of gears, any one of which can be brought into mesh with a gear on one of the shafts, while one end of the stub shaft carries a gear meshing with a gear on the other shaft.

55. In a film spooling machine, the combination with a spindle for rotating a spool to wind a film band thereon, of a shaft for supplying power, a spindle to rotate the spool, and means including a cam for controlling the rotation of the spindle through a cycle of operations to completely wind and assemble a film band upon a spool, and a signal coordinated with the cam to indicate when the controlling mechanism is in its initial or starting position.

56. In a film spooling machine, the combination with a spindle for rotating a spool to wind a film band thereon, of a shaft for supplying power, a spindle to rotate the spool, and means including a cam for controlling the rotation of the spindle through a cycle of operations to completely wind and assemble a film band upon a spool, a shaft for rotating the cam, an eccentric carried by the cam shaft, and a signal, the signal being supported by a cam rod so that the cam will be acted upon by the eccentric to move the signal to a position indicating the initial position of a cycle of operations.

Signed at Rochester, New York, this 12th day of November 1921.

JOHN G. JONES.